United States Patent
Kondaveeti (10) Patent No.: US 12,363,137 B2
(45) Date of Patent: Jul. 15, 2025

(54) DETECTION OF MULTI-KILLCHAIN ALERTS

(71) Applicant: salesforce.com, inc., San Francisco, CA (US)

(72) Inventor: Anirudh Kondaveeti, Redwood City, CA (US)

(73) Assignee: Salesforce, Inc., San Francisco, CA (US)

( * ) Notice: Subject to any disclaimer, the term of this patent is extended or adjusted under 35 U.S.C. 154(b) by 355 days.

(21) Appl. No.: 17/649,552

(22) Filed: Jan. 31, 2022

(65) Prior Publication Data

US 2023/0247031 A1    Aug. 3, 2023

(51) Int. Cl.
*H04L 9/40*    (2022.01)

(52) U.S. Cl.
CPC ...... *H04L 63/1416* (2013.01); *H04L 63/1425* (2013.01); *H04L 63/1466* (2013.01); *H04L 63/20* (2013.01)

(58) Field of Classification Search
CPC ............. H04L 63/1416; H04L 63/1425; H04L 63/1466; H04L 63/20
See application file for complete search history.

(56) References Cited

U.S. PATENT DOCUMENTS

| | | | | |
|---|---|---|---|---|
| 11,736,503 | B2* | 8/2023 | Kondaveeti | H04L 63/1425 |
| 2018/0004942 | A1* | 1/2018 | Martin | G06F 21/554 |
| 2021/0081539 | A1* | 3/2021 | Karin | G06F 21/577 |
| 2021/0243208 | A1* | 8/2021 | Rubin | G06F 21/552 |
| 2021/0409426 | A1* | 12/2021 | Engelberg | H04L 41/22 |
| 2022/0318381 | A1* | 10/2022 | Liu | G06F 21/552 |
| 2023/0419402 | A1* | 12/2023 | Ghelichi | G06N 5/01 |

OTHER PUBLICATIONS

Steffen Haas and Mathias Fischer, GAC: Graph-Based Alert Correlation for the Detection of Distributed Multi-Step Attacks, https://doi.org/10.1145/3167132.3167239, SAC '18: Proceedings of the 33rd Annual ACM Symposium on Applied ComputingApril, pp. 979-988, Apr. 9-13, 2018.

The Connected Components Algorithm, https://graphstream-project.org/doc/Algorithms/Connected-Components/, 3 pages.

Steffen Haas, et al., Efficient Attack Correlation and Identification of Attack Scenarios based on Network-Motifs, 2019 IEEE, 12 pages, May 2019.

* cited by examiner

*Primary Examiner* — Harris C Wang
(74) *Attorney, Agent, or Firm* — Kowert, Hood, Munyon, Rankin & Goetzel, P.C.; Dean M. Munyon (57) ABSTRACT

A method for the detection of multi-killchain alerts is disclosed. The method includes receiving, by a computer system, a plurality of alerts indicative of activity within a computer network, wherein a given alert specifies one or more events having attributes, and extracting attributes from events included in the plurality of alerts. The method further includes determining attribute similarity for pairs of events based on whether a given pair of events has common values for one or more attributes and whether attribute values of the given pair of events indicates lateral movement within computers of the computer network. Linked pairs are then identified based on the determined attribute similarity and added to a graph data structure. The method further includes the computer system analyzing the graph data structure to find clusters of events relating to a security attack.

17 Claims, 8 Drawing Sheets

DETECTION OF MULTI-KILLCHAIN ALERTS

BACKGROUND

Technical Field

This disclosure is directed to network security, and more particularly, to detecting attacks that involve lateral movement within a computer network.

Description of the Related Art

Many organizations employ computer networks that enable both local and remote access by that organization. For remote network access, some sessions may be conducted over other networks that are not in and of themselves secure networks. To provide secure access to an organization's network over an otherwise unsecure network, various protocols may be utilized. These protocols may provide secure access to the organization's network through otherwise unsecure networks.

Despite the use of security protocols, networks may still at times be subject to access by malicious actors. Attackers of a network may use compromised user credentials and other tactics to obtain network access. Such attackers may also employ tactics to evade detection during an unauthorized access to a network. By obtaining unauthorized access and evading detection, an attacker may obtain protected information or may compromise a network in other ways (e.g., such as a distributed denial of service attack).

BRIEF DESCRIPTION OF THE DRAWINGS

The following detailed description makes reference to the accompanying drawings, which are now briefly described.

DETAILED DESCRIPTION OF EMBODIMENTS

Network security requires monitoring a very large number of events, some of which may be alerts to an attempted attack of the network. Killchain alerts are a particular type of alert in which alerts of the set belong to different parts of a killchain (which is a set of events that occur in a given attack, e.g., reconnaissance, exploitation, installation, etc.). One example of a killchain alert is an alert relating to port scanning alert; another would be an alert relating to lateral movement within a computer network.

The present disclosure is directed to recognizing a group of related alerts that belong to different parts of the killchain and creating an "uber" alert, referred to herein as a multi-killchain alert, that includes an aggregation of multiple killchain alerts. As noted, a typical alert triggers only for a single phase of an attack killchain. For example, separate alerts are typically received for reconnaissance and lateral movement. The multi-killchain alerts of the present application correlate these individual alerts to create a larger, more comprehensive alert.

During normal network operations, a large number of alerts (and thus events, where each alert contains one or more events) typically occur. These alerts, and their corresponding events, may be indicative of attacks. However, given the very large number of events/alerts, correlating these events to detect an attack can present significant challenges.

The present disclosure is directed to various embodiments of a method for detecting multi-killchain alerts to detect a network attack. The method includes the utilization of a graph structure and clusters of correlated events to detect attacks. Attributes of various events are determined and can be used to link events with other events, using different scoring techniques. This in turn can be used to generate the graph structure, where events correspond to nodes and correlation between the events correspond to the edges. In this manner, clusters of events are highlighted, enabling the detection of attacks against the network. This methodology may enable the detection of network attacks within the context of a large number of events/alerts.

In various embodiments, different types of scores may be generated to link events. Generation of these scores may be based on attributes of various events. The scores can be used to indicate a commonality or a correlation between different events.

In one embodiment, a score known as a feature score is generated when first and second events have a common source IP (internet protocol) address and a common destination IP address. More generally, a feature score is used to indicate that two different events have one or more common attributes. The score may, in one particular embodiment, have a range between 0 and 2, although different ranges may be present in other embodiments. For example, in one embodiment, if neither the source nor destination IP addresses match for a pair of events, the score is 0. If both the source and destination IP addresses match for the pair of events, the score is 2.

Another type of score that may be generated in various embodiments is referred to as a reverse feature score, which may indicate the presence of lateral movement in a network by an attacker. The reverse feature score is, in various embodiments, based on a source IP for one event matching a destination IP of another event, and may also have a range of values from 0 to 2 (although other ranges are possible and contemplated). For example, if the source IP for a first event matches the destination IP for a second event, while the source IP for the second event matches the destination IP of the first event, the score may have a value of 2. If the source IP for the first event does not match the destination IP for the second event while the source IP for the second event does not match the destination IP for the first event, the score may have a value of 0. A score of 1 may be generated where one set of these values matches while the other set does not match.

Using techniques such as those described above, a graph structure may be generated. The graph structure utilizes the events as the nodes of the graphs, while edges may connect two nodes if their feature score or reverse feature score as described above has a value greater than 0. In this manner, clusters of events may be highlighted, thereby indicating to the computer system and/or a network administrator the presence of attacks on the network security. Various embodiments of the methodology discussed above will now be described in further detail.

Figure 1:
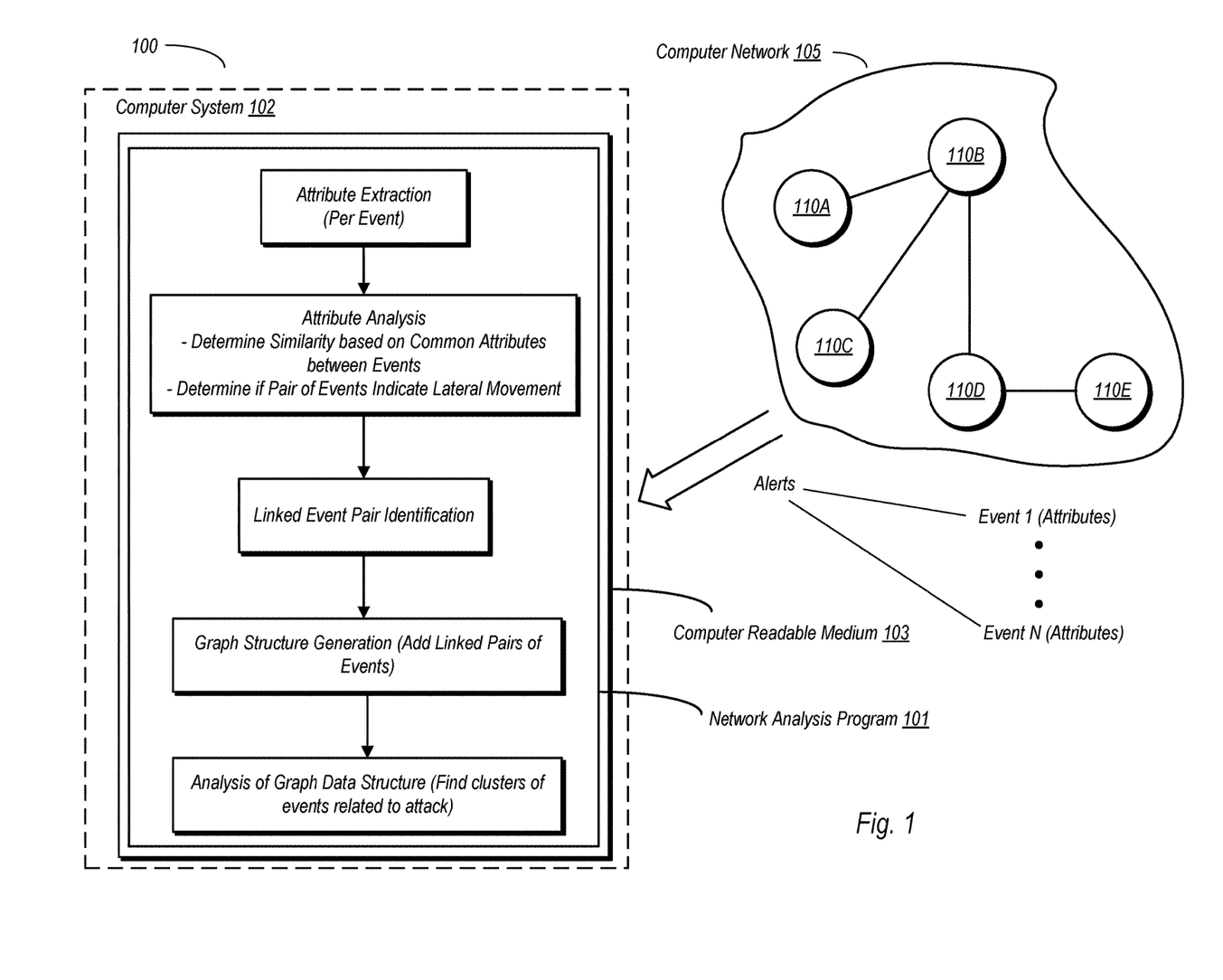
FIG. 1 is a diagram of one embodiment of a system for detecting attacks against a network.

Turning now to FIG. 1, a diagram of one embodiment of a system 100 for detecting attacks against a network is shown. In the embodiment shown, computer system 102 includes a non-transitory computer readable medium 103 (e.g., random access memory, solid state drive, etc.). Instructions implementing network analysis program 101 are stored on computer readable medium 101. Computer system 102 may thus carry out network security functions by executing the instructions of network analysis program. Computer system 102 is arranged to receive alerts from computer network 105, which includes a number of hosts 110 (e.g., 110A, 110B, etc.). The network analysis program 101 in the embodiment shown extracts events from the alerts, the various ones of the events having various attributes. By using the various attributes, network analysis program 101 may detect attempted network attacks on computer network 105. The attribute analysis conducted by network analysis program 101 may include determining similarity based on certain events having common attributes with one another, as well as determining whether the events are indicative of lateral movement within the network. The alerts may include multi-killchain alerts that are indicative of attacks on computer network 105.

The various alerts received by computer system 102 each include a number of events that have various attributes. Using these attributes, network analysis program 101 may detect links between the events. Based on identifying pairs of events that are linked (based on their respective attributes), network analysis program 101 assembles a graph structure. Using the graph structure, pairs/clusters of linked events may be highlighted. These highlighted clusters of two or more events may indicate the presence of security attacks on network 105. Based on detecting such attacks, a network administrator may take actions to stop the attack.

Each of the alerts received by computer system 102 includes one or more events. Each of the events has attributes that describe the event. These attributes may include a time stamp indicative of when the event occurred, a source host, and a destination host, among other types of information that may be provided. Furthermore, each of the alerts is associated with a detection alert criteria (DAC), and may also have a detection security event criteria (DSEC) identifier associated therewith. As will be explained in further detail below, DACs and DSEC may be used to extract attributes from the events.

The graph structure generated by network analysis program 101 may be constructed using events as the nodes, with relationships between the events as edges. The events may be considered to be linked to one another in one embodiment based on a feature score and a reverse feature score (to be discussed in further detail below). The feature and reverse feature scores are based on attributes of the events, which higher feature scores indicating commonality between events. These attributes, as extracted using the DACs and DSECs, may include source IP (internet protocol) address, destination IP address, source port, and destination port.

Network analysis program 101 in the embodiment shown may determine whether attribute values for a given pair of events includes lateral movement based on determining whether a destination attribute for a first event of a given pair matches a source attribute of a second event of the given pair. The determination that events are linked may further include a determination as to whether the first and second events have common values for their respective source and destination IP addresses, and may further include determining whether a destination IP address of the first event matches a source IP address of the second event (and/or vice versa). The first and second events may also be considered to be linked based on whether the first event and the second event have common values for source port number and destination port number. If the destination port number of a first event matches a source port number of the second event (and/or vice versa), the two events may also be considered to be linked. Determining commonality between pairs of events in this manner may allow the use of network analysis program 101 to determine whether linked pairs of events include lateral movement, as well as determining whether pairs of events belong to different parts of an attack killchain.

Since a given event may have common attributes with more than one other event, the graph structure may highlight clusters of events that include three or more. These clusters may be identified in a graph structure using a connected components algorithm implemented by network analysis program 101. The connected components algorithm may analyze the graph structure to detect clusters in which two or more events are connected to one another by common attributes. The network analysis program 101 may, upon finding these clusters, present them visually in a graphical user interface to enable further analysis by, e.g., a network administrator that can then take action to thwart any ongoing attacks.

Figure 2:
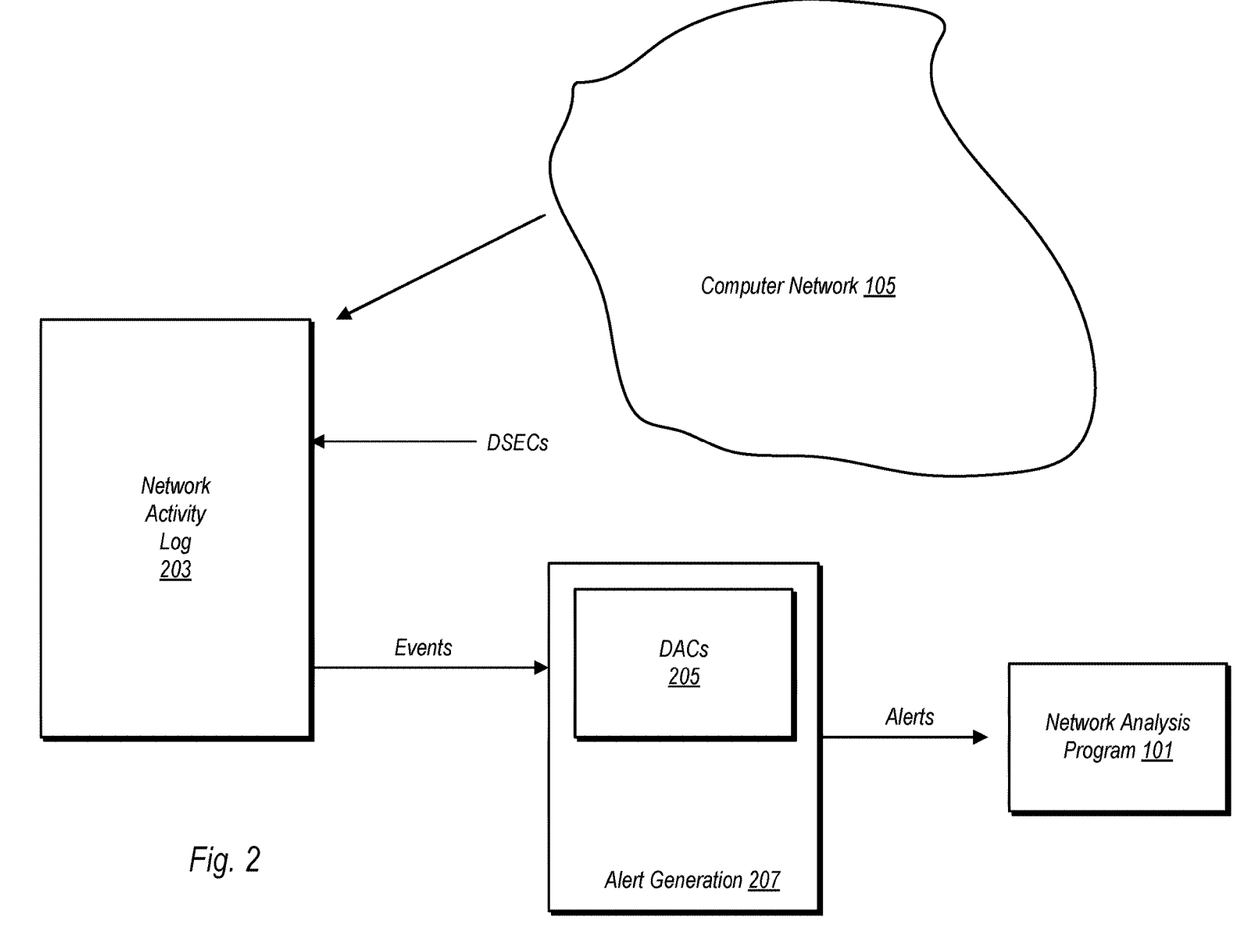
FIG. 2 is a diagram illustrating further details of an embodiment of a system for detecting attacks against a network.

FIG. 2 is a diagram of one embodiment that illustrates alerts that are received by computer system 102 for analysis. In the embodiment shown, activity on computer network 105 is recorded in network activity log 203. "DSECs" may then be applied to the record of activity stored in network activity log. A DSEC is a rule (e.g., a SPLUNK query) used to generate an event from the logged network activity; each DSEC belongs to a specific kill chain stage and MITRE attack tactic. A query may be run using search processing language to communicate with network activity log. An example DSEC to detect successful logins on a Pardot platform from known bad actors is shown below:

```
index=ProductName-websvc sourcetype=ProductName ActionName="*"
EventMessage="Login Success"
IPSource="*" AND (IPSourceCompanyName="*CompanyName1*" OR
IPSourceCompanyName="*CompanyName2 *"
OR IPSourcecompanyName="*Companyname3*" OR
IPSourcecompanyName="#CompanyName4"
OR IPSourceCompanyName="*CompanyName5 *'
OR IPSourceCompanyName="CompanyName6 ")
xyz(a353A00000AwuM8)
```

In the example above, a query is made for events having a message of "Login Success," for an IP source of one of a number of different company names. The event message and the IP source comprise the event criteria for this particular DSEC. In response to receiving this query, a search is performed on the network activity log. Events corresponding to the query may be provided to alert generation module 207.

Upon receiving the events of the query, various DACs 205 may be applied thereto in order to detect security alerts. A DAC is a rule used to aggregate events of a specific type to generate an alert. An example DAC having an identifier "a2N3A0000004erMUAQ" is shown below. The example DAC aggregates events from a particular DSEC having an identifier "a353A0000091ErU %" that occur within a five-minute time window.

```
SELECT
    COUNT (*) AS securityEventsCount,
    multisetToSecurityEvents(COLLECT (keyValues)) AS
    SecurityEventList,
    "a2N3A0000004erMUAO" AS dacId
    CAST (TUMBLE_START (eventTimestamp, INTERVAL "5"
    MINUTE) AS TIMESTAMP)
    AS startwindowTime, TUNBLE_ROWTINE (eventTimestamp,
    INTERVAL 'S" MINUTE) AS endwindowTime
FROM events
WHERE
    mapGet(keyValues, 'dsec_ id') LIKE '7353A000009 fErUa
GROUP BY
    TUMBLE (eventTimestamp, INTERVAL mapGet(keyValues
    "environment
```

The events having the criteria specified in the example code above may then be gathered by alert generation module 207, using DACs 205. These events may then be provided to network analysis program 101 to enable examination of their respective attributes and thus to determine whether particular events are related to one another.

Figure 3A:
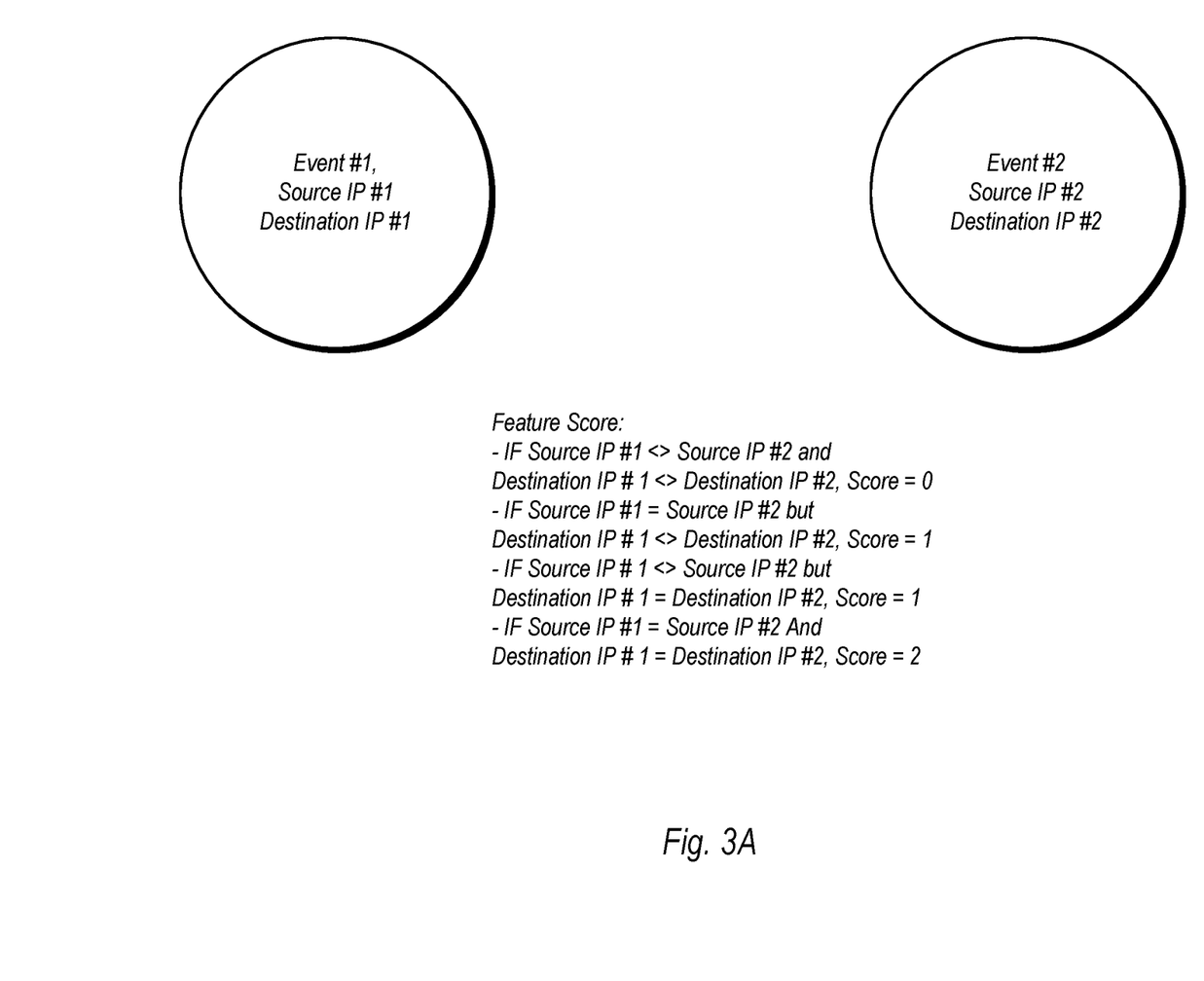
FIG. 3A is a diagram illustrating the scoring of a relationship between two events for one embodiment of a method for detecting attacks against a network.

FIG. 3A illustrates one embodiment of the generation of a feature score between two network events. In general, a "feature score" for purposes of the present disclosure, constitutes a measurement of similarity between events based on whether the events have common values for particular attributes.

In the illustrated example, there are two events, Event #1 and Event #2. Event #1 has attributes that include a source IP address (Source IP #1) and a destination IP address (Destination IP #1). Similarly, Event #2 has attributes that includes Source IP #2 and Destination IP #2. The feature score in this example is generated based on matches between the source IP addresses as well as matches between the destination IP addresses.

If Source IP #1 and Source IP #2 do not match, while Destination IP #1 and Destination IP #2 are also a mismatch, a feature score of 0 results. If Source IP #1 matches Source IP #2, but the respective destination IPs of Events 1 and 2 do not match, a feature score of 1 is generated. Similarly, a feature score of 1 is generated when the respective source IPs do not match but Destination IP #1 and Destination IP #2 do match one another. If both the source IP and destination IP for Events #1 and 2 match one another, a feature score of 2 is generated. In one embodiment, where the feature score between two events is a 1 or a 2, two events are considered to be linked to one another, which will be reflected in the resulting graph structure generated by network analysis program 101. More generally, a feature score can be evaluated and, based on a suitable score (which depends on the attributes used in its generation), the events can be considered linked if the score has a particular value or falls within a specified range.

It is noted that while the feature score example shown here is based on source and destination IPs, features scores based on other attributes, such as source and destination ports, are also possible and contemplated. Note that if more attributes are considered for comparison between events, the total possible feature score may change.

Figure 3B:
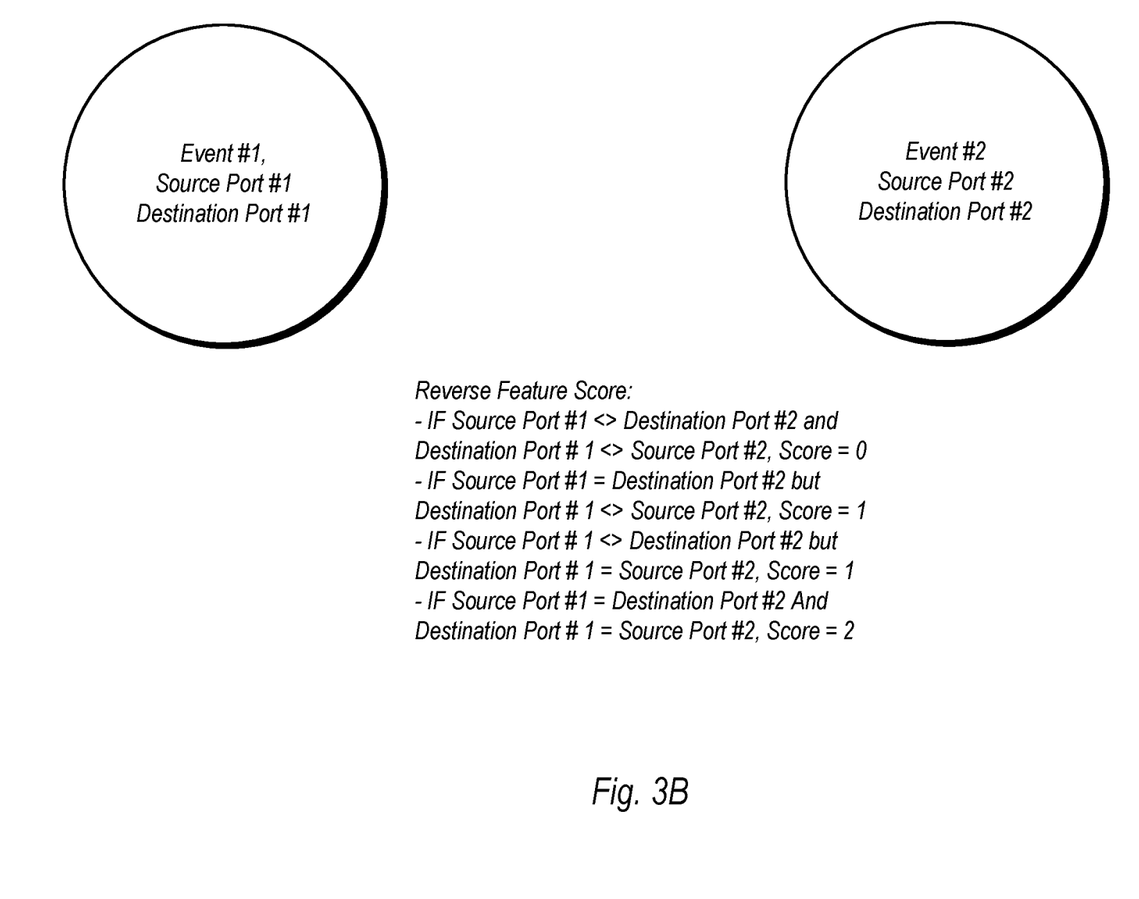
FIG. 3B is a diagram further illustrating the scoring of a relationship between two events for one embodiment of a method for detecting attacks against a network.

FIG. 3B illustrates one embodiment of the generation of a reverse feature score, which can also be used to determine a similarity in attributes between two events. As with the example of feature scores discussed above, the reverse features scores of the illustrated embodiment may vary between values of 0 and 2, in one embodiment. It is further noted that, while the example of FIG. 3B is provided in terms of source and destination ports, reverse feature scores may be generated based on other attributes as well, such as source and destination IP addresses. In general, a "reverse feature score" is an indication that two events are linked by a comparison of attributes that indicates lateral movement within a computer network. Whereas a feature score indicates that two events may be occurring on a same host, a reverse feature score tends to indicate that two events may indicate movement from a first host to a second host within a computer network.

In the illustrated example, Event #1 has attributes including Source Port #1 and Destination Port #1. Event #2 has attributes that include Source Port #2 and Destination Port #2. The reverse feature score per this example is determined based on comparisons of the source port of one event to the destination port of another event.

A reverse feature score of 0 is generated in the instances in which Source Port #1 is not equivalent to Destination Port #2 while Source Port #2 is not equivalent to Destination Port #1. If Source Port #1 is equivalent to Destination Port #2, but Source Port #2 is not equivalent to Destination Port #1, a feature score of 1 is generated. Similarly, a feature score of 1 is generated when If Source Port #2 is equivalent to Destination Port #1, but Source Port #1 is not equivalent to Destination Port #2. If both Source Port #1 is equivalent to Destination Port #2 and Source Port #2 is equivalent to Destination Port #1, a feature score of 2 is implemented. In one embodiment, where the reverse feature score between two events is a 1 or a 2, the two events are considered to be linked to one another, which will be reflected in the resulting graph structure generated by network analysis program 101.

Figure 4A:
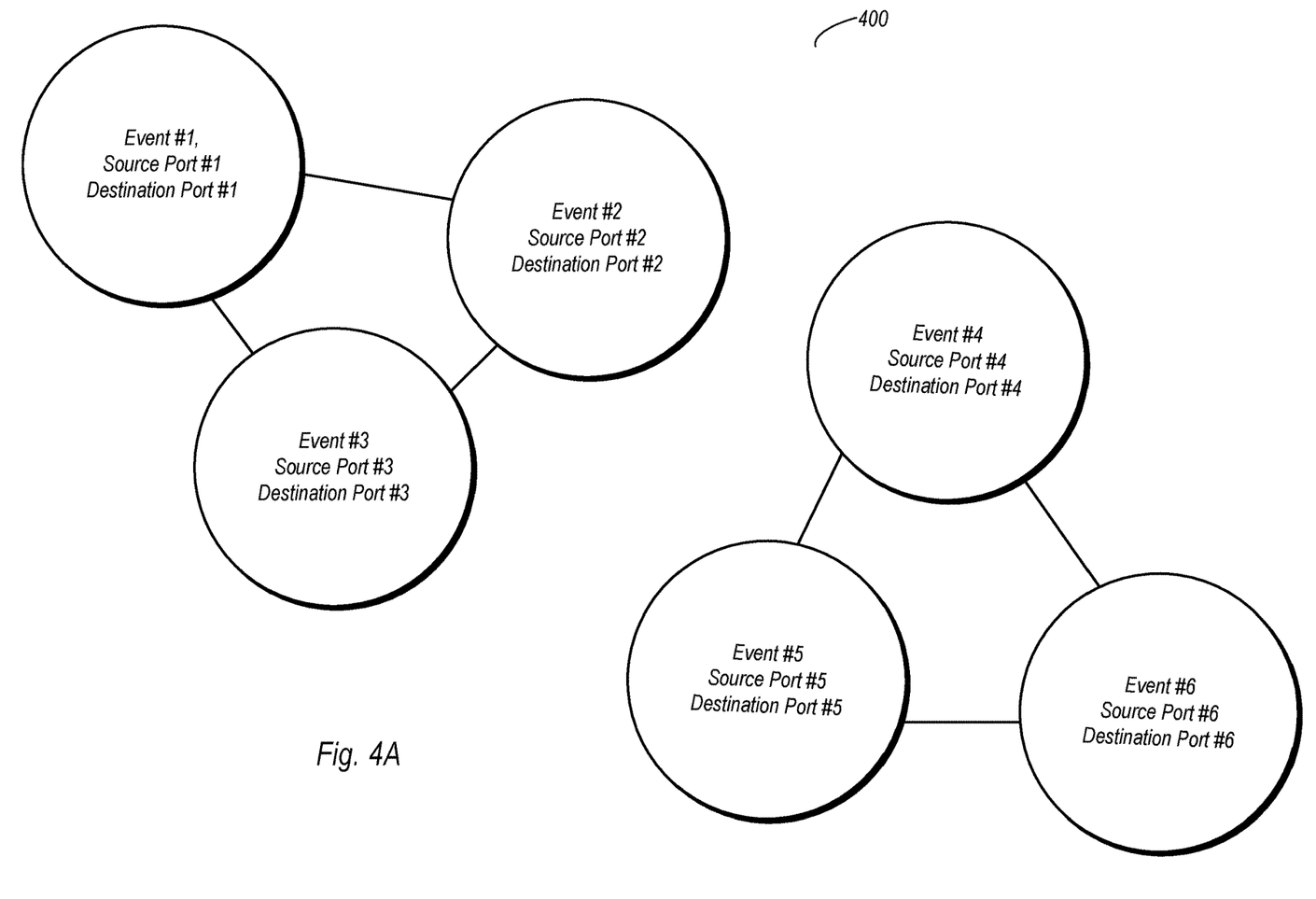
FIG. 4A is diagram illustrating a graph structure used to correlate events in one embodiment of a method for detecting attacks against a network.

FIG. 4A is diagram illustrating a graph structure used to correlate events in one embodiment of a method for detecting attacks against a network. More particularly, FIG. 4A illustrates, for explanatory purposes, a conception of how events can be linked in a graph structure. In the embodiment shown, graph structure 400 includes six different events (Events #1 to #6). Each of these events is represented by a node in the graph. The attributes for each of the illustrated events includes corresponding source and destination ports. Although not explicitly shown, attributes such as source and destination IP addresses may also be associated with each of the events. During operation, network analysis program 101 may receive a very large number of alerts. Embodiments in which network analysis program 101 receives alerts numbering in the tens of thousands over a relatively short time period (e.g., one day or less) are possible and contemplated. Furthermore, since some alerts can comprise more than one event, the number of events can be very large. However, by determining the linkages between events during the assembly of the graph structure, the clusters of linked events can thus be used to highlight potential attacks on the corresponding network. This in turn can allow for a faster detection of attacks relative to other methodologies.

As alerts and their corresponding events are received, a node for each event is added to the graph model. As noted above, there can be tens of thousands of events in the graph structure. Pairs of nodes, corresponding to events, are compared, and for those comparisons that indicate some similarity (e.g., non-zero feature score) between their corresponding events, a connection, or edge, is added between the nodes. One possible format of the graph illustrated in FIG. 4A is as follows:

```
<node 0>
<node 1>
<node 2>
    .
    .
<node n>.
```

If a comparison between, e.g., node 0 and node 2 results in an indication that the two nodes are linked (e.g., by a non-zero feature score), the database may be updated as follows:

```
<node 0>: <node 2>
<node 1>
<node 2>: <node 0>.
```

When all possible pairs of nodes are compared for linkage, the graph structure will include, for a given node, a list of all other linked nodes. The list for a given node therefore indicates the edges of the given node.

In general, nodes can be considered to be linked when some similarity criteria is met. In one embodiment, this constitutes a non-zero feature score or non-zero reverse feature score. For example, if a feature score between two events is non-zero, the nodes representing these events are connected by an edge. In another example, two nodes can be connected by an edge if a reverse feature score between their corresponding events is non-zero.

Figure 4B:
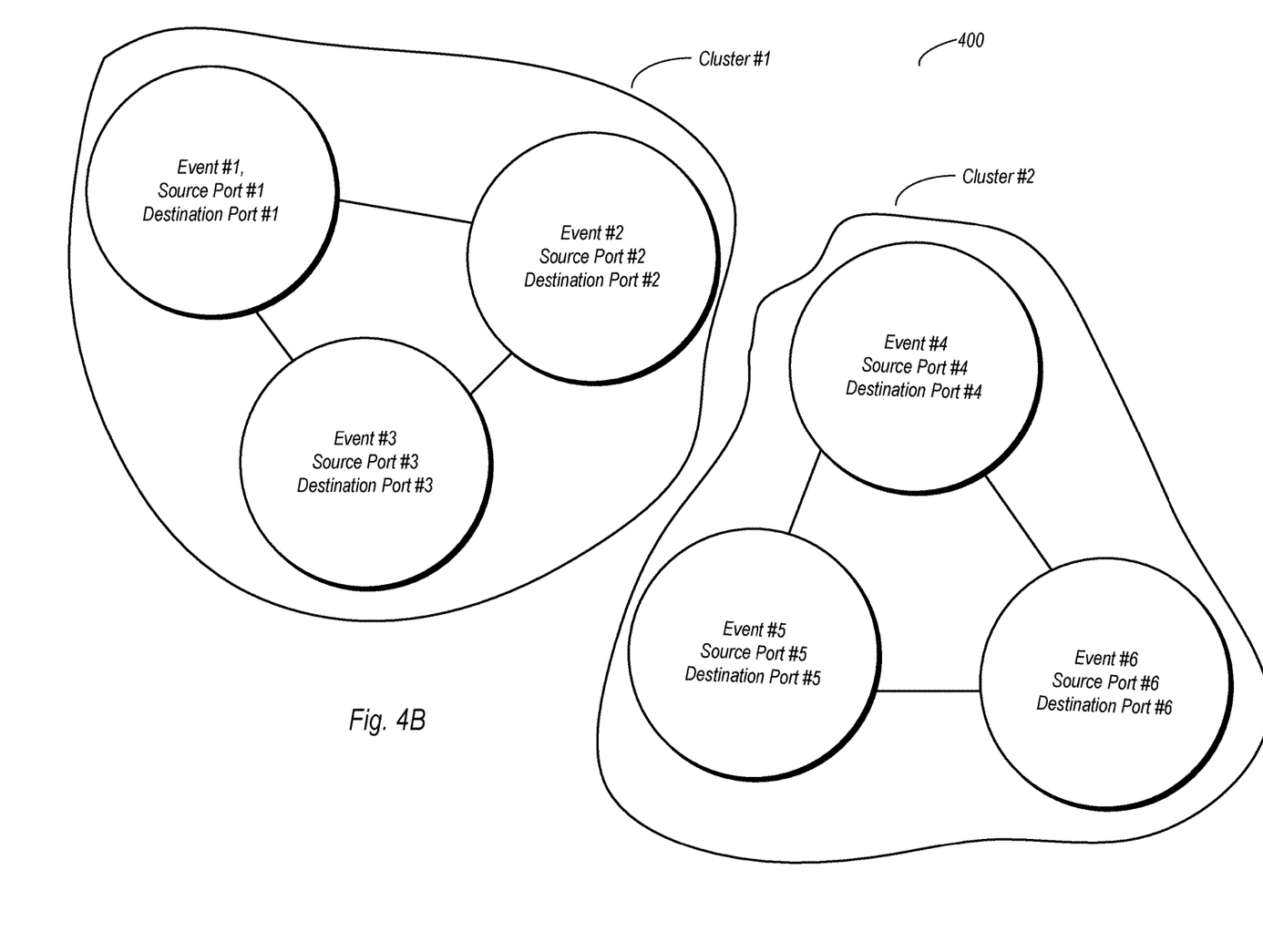
FIG. 4B is a diagram illustrating the detection of clusters of events in a graph structure in one embodiment of a method for detecting attacks against a network.

FIG. 4B is a diagram illustrating the detection of clusters of events in a graph structure in one embodiment of a method for detecting attacks against a network. It is noted that the clusters illustrated in FIG. 4B may be part of a much larger graph structure is a number of nodes that can be several orders of magnitude greater than the number actually shown in the drawing. In the illustrated example, Events #1, #2, and #3 are each related to one another and comprise a first cluster, Cluster #1. The three events may also be considered to comprise three different event pairs (e.g., Event #1 and Event #2 comprise a first pair, Event #1 and Event #3 comprise a second pair, and so on). Similarly, Events #4, #5, and #6 comprise a second cluster of events, Cluster #2. As discussed above, these clusters may be detected using a connected components algorithm.

The clusters of the events shown in the example of FIG. 4B may be indicative of network attacks. When the graph structure reveals event clusters standing out within a graph of a large number of events (many having no relation to other events), it may be a multi-killchain alert indicative of a network attack that includes both lateral movement and port scanning.

The linkages between nodes in FIG. 4B may be determined in one embodiment using a connected components algorithm. As used herein, a "connected components algorithm" is a type of algorithm used to find clusters (or sub-graphs) of connected nodes in a larger graph structure. For example, in each of FIGS. 4A and 4B, there are two distinct sub-graphs that can be computed by a connected components algorithm. Two nodes may be considered to belong to the same cluster when a connection is present between them. For purposes of the present disclosure, a pair of nodes in the graph structure is considered to be connected if they meet certain similarity criteria (e.g., if they have a non-zero feature score or non-zero reverse feature score). Any group of two or more nodes that are connected to one another in the graph structure are a cluster of nodes. To constitute a cluster, every node in a cluster need not be directly connected to every other node in the cluster; rather, two nodes may be considered to be in the same cluster if a traversal path exists from one node to the other. (When determining a traversal path, directionality of the edges may be ignored in some implementations.) The connected components algorithm is therefore usable to find these clusters within the larger graph structure in an efficient manner. Such algorithms may therefore be optimized to solve this type of problem efficiently. In the context of the present disclosure, a connected component algorithm permits the correlation of alerts within different parts of the killchain, which advantageously allows for the creation of multi-killchain alerts.

An initial computation in the connected components algorithm is made with n as the number of nodes, and a corresponding complexity of O(n). During re-optimization, the number of nodes is k, where k<=n, and thus the complexity is O(k). The algorithm may work with a dynamic graph, without having to recompute from scratch each time the graph is changed. A query to the algorithm may be made for the number of connected components at any time with a call to the getConnectedComponentsCount( ) method. An example of the algorithm is presented below:

```
import org.org1.algorithm.ConnectedComponents;
import org.org1.graph.Graph;
import org.org1.graph.implementations.DefaultGraph;
public class CCTest {
    public static void main(String[ ] args) {
        Graph graph = new DefaultGraph("CC Test");
        graph.addNode("A");
        graph.addNode("B");
        graph.addNode("C");
        graph.addEdge("AB", "A", "B");
        graph.addEdge("AC", "A", "C");
        ConnectedComponents cc = new ConnectedComponents( );
        cc.init(graph);
        System.out.printf("%d connected component(s) in this graph, so far.%n",
            cc.getConnectedComponentsCount( ));
        graph.removeEdge("AC");
        System.out.printf("Eventually, there are %d.%n",
            cc.getConnectedComponentsCount( ));
    }
}
```

In various embodiments, the graph structure shown in FIGS. 4A and 4B may be used in generating a display indicating the attacks graphical user interface (GUI). The information displayed that is indicative of attacks can be presented in various forms. For example, a list of linked events may be displayed, along with a basis for their linkage (e.g., feature scores, reverse feature scores, and so on) More generally, the displayed information may correspond to that which is generated in the illustrated graph structure using the connected components algorithm discussed above. For example, where two nodes are determined as linked by the connected components algorithm and are thus linked in the graph structure, a display in a user interface for network analysis program may list the two events and the basis of their linkage in the graph structure.

Figure 5:
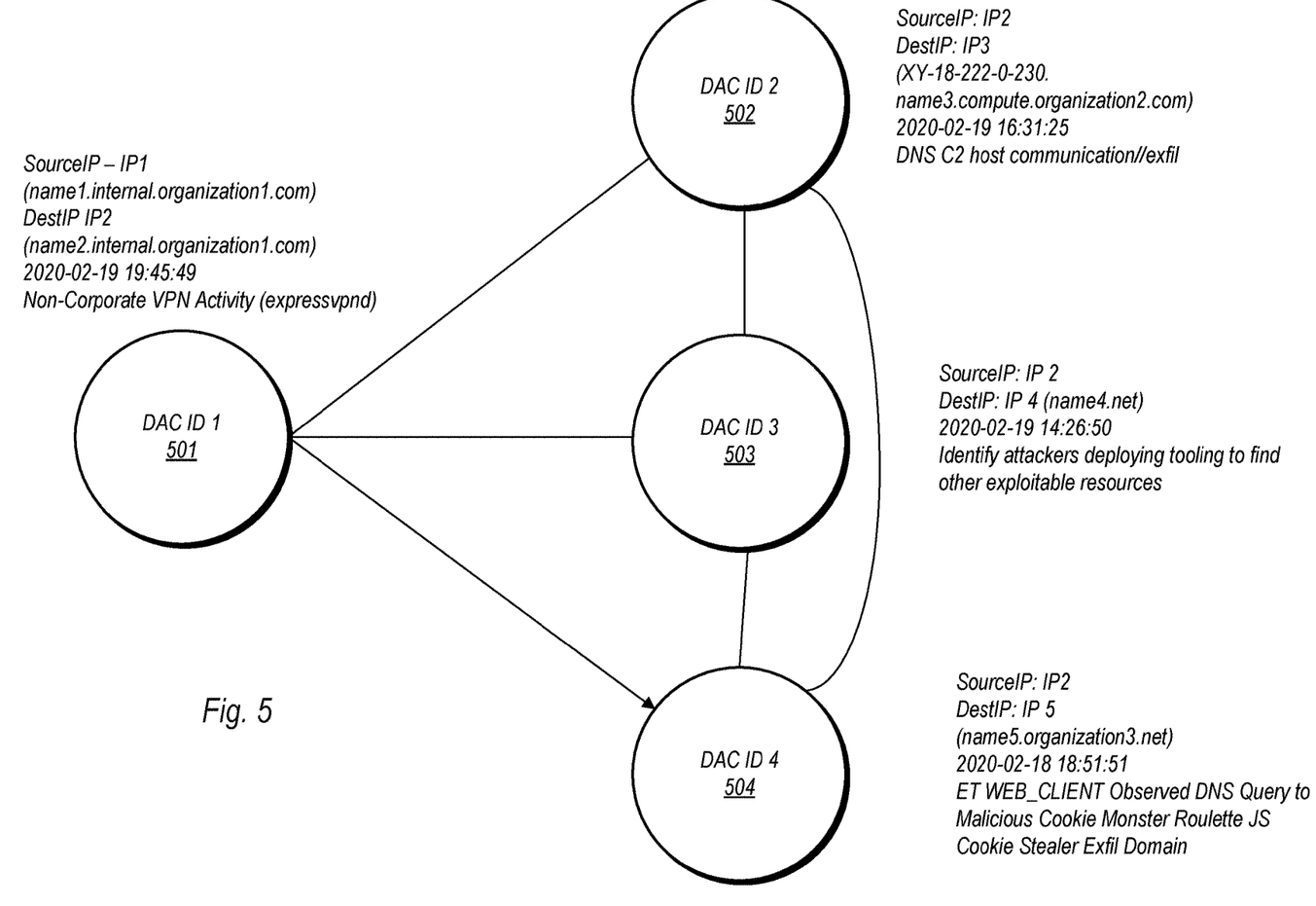
FIG. 5 is a diagram illustrating linked events that correspond to parts of a killchain.

Turning now to FIG. 5, diagram further illustrating linked events that correspond to different parts of a killchain. The illustrated example includes events 501, 502, 503, and 504, each of which includes a unique DAC identifier (DAC ID). Furthermore, event 501 in the illustrated example has links to each of events 502, 503, and 504, and thus FIG. 5 illustrates one example of a multi-killchain alert.

Event 501 in the embodiment shown has a destination IP address of IP2 which coincides with the source IP address of each of events 502, 503, and 504. However, the source IP address of event 501 does not coincide with the destination IP addresses of events 502, 502, and 504. Thus, event 501 has a reverse feature score of 1 with respect to each of events 502, 503, and 504, thereby establishing that the events are linked.

Each of events 502, 503, and 504 have a common source IP address of IP2, but different destination IP addresses. Accordingly, each of events 502, 503, and 504 have a feature score of 1 with respect to one another, and are thus linked events. Based on the reverse feature score of 1 (between event 501 and each of events 502, 503, and 504) and the feature score of 1 (between each pair of events in the group of 502, 503, and 504), the events thus form a cluster in the graph structure, and are indicative of an attempted attack on a corresponding network. More particularly, the aggregated group of events corresponds to a multi-killchain alert, which includes multiple individual alerts.

Additional information is shown corresponding to each event. For example, event 501 corresponds to non-corporate virtual private network (VPN) activity, which may indicate a mechanism by which an attacker entered the network. Event 502 is associated with host communication and exfiltration, which may indicate an attacker attempting to exfiltrate information from a host on the network. Event 503 is associated with attackers probing for other exploitable resources within the network. Event 504 is also associated cookie-based exfiltration.

Figure 6:
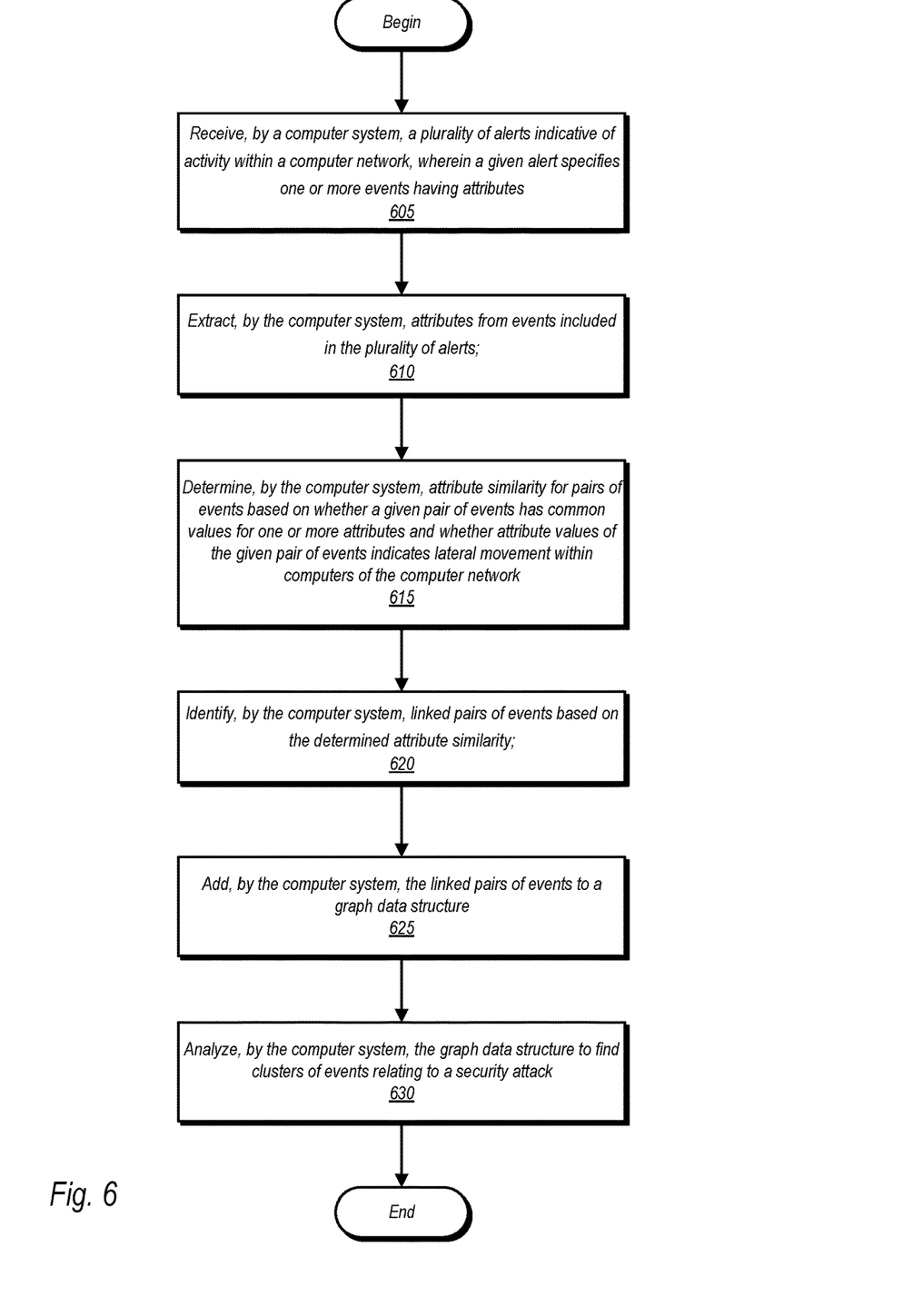
FIG. 6 is a flow diagram illustrating one embodiment of a method for detecting attacks against a network.

FIG. 6 is a flow diagram illustrating one embodiment of a method for detecting attacks against a network. Method 600 as disclosed herein may be carried out by various embodiments of the system as discussed above. Other embodiments of a system that may carry out Method 600 may also fall within the scope of this disclosure.

Method 600 includes receiving, by a computer system, a plurality of alerts indicative of activity within a computer network, wherein a given alert specifies one or more events having attributes (block 605). The method further includes extracting, by the computer system, attributes from events included in the plurality of alerts (block 610). The extracting of attributes may, in various embodiments, include determining source and destination IP addresses, source and destination ports, and so on. The method continues with determining, by the computer system, attribute similarity for pairs of events based on whether a given pair of events has common values for one or more attributes and whether attribute values of the given pair of events indicates lateral movement within computers of the computer network (block 615). For example, the computer system, executing a network analysis program such as that discussed above can determine if the source IP addresses match for two events or whether the source IP address of one event matches a destination IP address of another event. The method further includes identifying, by the computer system, linked pairs of events based on the determined attribute similarity (block 620), adding, by the computer system, the linked pairs of events to a graph data structure (block 625), and analyzing, by the computer system, the graph data structure to find clusters of events relating to a security attack (block 630).

In various embodiments, determining whether attribute values for a given pair of events indicate lateral movement includes determining whether a destination attribute of a first event of the given pair of events matches a source attribute of a second event of the given pair of events. In various embodiments, the one or more attributes include source IP address and destination IP address. Determining attribute similarity includes determining whether the first event and the second event have common values for the source IP address and for the destination IP address and determining whether the destination IP address of the first event matches the source IP address of the second event.

In some embodiments of the method, the one or more attributes include source port number and destination port number. In such embodiments, the determining of attribute similarity includes determining whether the first event and the second event have common values for the source port number and for the destination port number and determining whether the destination port number of the first event matches the source port number of the second event.

In some embodiments the given pair of events is considered to be linked based on one or both of the given pair of events having common values for one or more attributes; and attribute values of the given pair of events indicating lateral movement. Furthermore, identifying linked pairs of events includes determining that a linked pair of events belong to different parts of an attack kill chain.

In some embodiments, analyzing the graph data structure to find clusters of events is performed using a connected components algorithm. The connected components algorithm in such embodiments is used to determine that two nodes in the graph structure are linked based on similarities between attributes of their corresponding events. The graph data structure in various embodiments comprises a plurality of nodes and a plurality of edges connecting pairs of nodes of the plurality of nodes, wherein ones of the plurality of nodes correspond to events, and wherein ones of the plurality of edges correspond to links between pairs of events. The method may also include a graphical user interface presenting a visual representation of a cluster of events.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Numerous variations and modifications will become apparent to those skilled in the art once the above disclosure is fully appreciated. It is intended that the following claims be interpreted to embrace all such variations and modifications.

What is claimed is:

1. A method, comprising:
 receiving, by a computer system, a plurality of alerts indicative of activity within a computer network, wherein a given alert specifies one or more events having attributes;
 adding, by the computer system, events specified by the plurality of alerts as nodes to a graph data structure;
 determining, by the computer system, attribute similarity for pairs of the events, wherein the determining includes, for a given one of the pairs, deriving:
  a feature score indicative of a number of particular attributes for which events of the given pair have a same value; and
  a reverse feature score indicative of whether a source attribute of a particular event of the given pair matches a destination attribute of another event of the given pair;
 identifying, by the computer system, ones of the pairs to link in the graph data structure based on the determined attribute similarity;
 adding, by the computer system, links, in the graph data structure, between events of the identified pairs, including adding a link between a first event and a second event of a first pair of events and a link between the first event and a third event of a second pair of events, and wherein the first event is linked to the second event based on a feature score associated with the first pair satisfying a feature threshold value and the first event is linked to the third event based on a reverse feature score associated with the second pair satisfying a reverse feature threshold value; and
 analyzing, by the computer system, the graph data structure to find clusters of events relating to a security attack.

2. The method of claim 1, wherein deriving the feature score for the given pair includes determining whether the particular event of the given pair and the other event of the given pair have same values for a source IP address and for a destination IP address, and wherein deriving the reverse feature score for the given pair includes determining whether the destination IP address of the particular event of the given pair matches the source IP address of the other event of the given pair.

3. The method of claim 1, wherein deriving the feature score for the given pair includes determining whether the particular event of the given pair and the other event of the given pair have same values for a source port number and for a destination port number, and wherein deriving the reverse feature score for the given pair includes determining whether the destination port number of the particular event of the given pair matches the source port number of the other event of the given pair.

4. The method of claim 1, wherein the given pair of events is considered to be linked based on one or both of the derived feature score and the derived reverse feature score.

5. The method of claim 1, further comprising determining that a linked pair of events belong to different parts of an attack kill chain.

6. The method of claim 1, wherein analyzing the graph data structure to find clusters of events is performed using a connected components algorithm.

7. The method of claim 1, further comprising presenting a graphical user interface presenting a visual representation of a cluster of events.

8. A non-transitory, computer-readable medium having program instructions stored thereon that are capable of causing a computing system to implement operations comprising:
 receiving a plurality of alerts indicative of activity within a computer network, wherein a given alert specifies one or more events having attributes;
 adding events specified by the plurality of alerts as nodes to a graph data structure;
 determining attribute similarity for pairs of the events, wherein the determining includes, for a given one of the pairs, deriving:
  a feature score indicative of a number of particular attributes for which events of the given pair have a same value; and
  a reverse feature score indicative of whether a source attribute of a particular event of the given pair matches a destination attribute of another event of the given pair;
 identifying ones of the pairs to link in the graph data structure based on the determined attribute similarity;
 adding links, in the graph data structure, between events of the identified pairs, including adding a link between a first event and a second event of a first pair of events and a link between the first event and a third event of a second pair of events, and wherein the first event is linked to the second event based on a feature score associated with the first pair satisfying a feature threshold value and the first event is linked to the third event based on a reverse feature score associated with the second pair satisfying a reverse feature threshold value; and
 analyzing the graph data structure to find clusters of events relating to a security attack.

9. The computer readable medium of claim 8, wherein deriving the feature score for the given pair includes determining whether the particular event of the given pair and the other event of the given pair have same values for a source IP address and for a destination IP address, and wherein deriving the reverse feature score for the given pair includes determining whether the destination IP address of the particular event of the given pair matches the source IP address of the other event of the given pair.

10. The computer readable medium of claim 8, wherein deriving the feature score for the given pair includes determining whether the particular event of the given pair and the other event have same values for a source port number and for a destination port number, and wherein deriving the reverse feature score for the given pair includes determining whether the destination port number of the particular event of the given pair matches the source port number of the other event of the given pair.

11. The computer readable medium of claim 10, wherein the operations further comprise determining that a linked pair of events belong to different parts of an attack kill chain.

12. The computer readable medium of claim 10, wherein the given pair of events is considered to be linked based on one or both of the derived feature score and the derived reverse feature score.

13. The computer readable medium of claim 8, wherein analyzing the graph data structure to find clusters of events is performed using a connected components algorithm.

14. A method comprising:
   determining, by a computer system, attributes for ones of a plurality of security alerts received by the computer system, wherein ones of the plurality of security alerts indicate activity on a computer network, and wherein ones of the security alerts specify one or more events having respective attributes;
   adding, by the computer system, events specified by ones of the security alerts as nodes to a graph data structure;
   determining, by the computer system based on the determined attributes, attribute similarities for pairs of the events, wherein the determining includes, for a given one of the pairs, deriving:
      a feature score indicative of a number of particular attributes for which events of the given pair have a same value; and
      a reverse feature score indicative of whether a source attribute of a particular event of the given pair matches a destination attribute of another event of the given pair;
   identifying, by the computer system, ones of the pairs to link in the graph data structure based on the attribute similarities;
   adding, by the computer system, links, in the graph data structure, between events of the identified pairs, including adding a link between a first event and a second event of a first pair of events and a link between the first event and a third event of a second pair of events, and wherein the first event is linked to the second event based on a feature score associated with the first pair satisfying a feature threshold value and the first event is linked to the third event linked based on a reverse feature score associated with the second pair satisfying a reverse feature threshold value; and
   analyzing, by the computer system, the graph data structure to identify clusters of events corresponding to a security attack, wherein the first, second, and third events are a part of a same attack kill chain.

15. The method of claim 14, wherein deriving the feature score for the given pair includes determining whether the particular event of the given pair and the other event of the given pair have same values for a source IP address and for a destination IP address, and wherein deriving the reverse feature score for the given pair includes determining whether the destination IP address of the particular event of the given pair matches the source IP address of the other event of the given pair.

16. The method of claim 14, wherein deriving the feature score for the given pair includes determining whether the particular event of the given pair and the other event of the given pair have same values for a source port number and for a destination port number, and wherein deriving the reverse feature score for the given pair includes determining whether the destination port number of the particular event of the given pair matches the source port number of the other event of the given pair.

17. The method of claim 14, wherein analyzing the graph data structure to find clusters of events is performed using a connected components algorithm.

* * * * *

UNITED STATES PATENT AND TRADEMARK OFFICE
CERTIFICATE OF CORRECTION

PATENT NO. : 12,363,137 B2  
APPLICATION NO. : 17/649552  
DATED : July 15, 2025  
INVENTOR(S) : Anirudh Kondaveeti Page 1 of 1

It is certified that error appears in the above-identified patent and that said Letters Patent is hereby corrected as shown below:

In the Claims

In Column 15 (Claim 11), Lines 19, please delete "The computer readable medium of claim 10," and insert -- The computer readable medium of claim 8, --.

In Column 15 (Claim 12), Lines 22, please delete "The computer readable medium of claim 10," and insert -- The computer readable medium of claim 8, --.

Signed and Sealed this  
Sixteenth Day of September, 2025

Coke Morgan Stewart  
*Acting Director of the United States Patent and Trademark Office*